Nov. 24, 1936.   T. DE ROODE   2,061,652
METHOD OF CINEMATOGRAPHY AND APPARATUS FOR USE THEREIN
Original Filed March 23, 1931   2 Sheets-Sheet 1
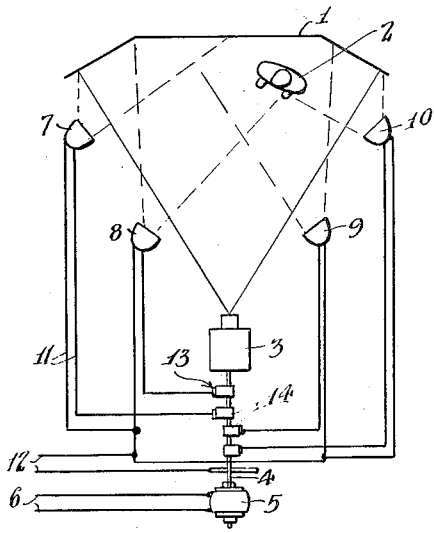
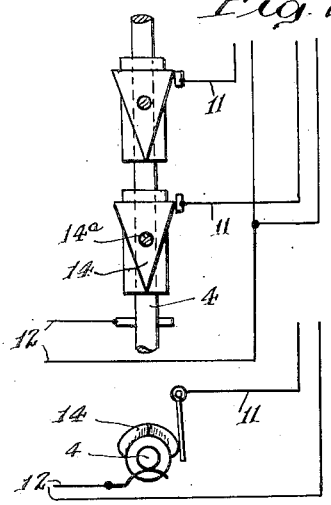
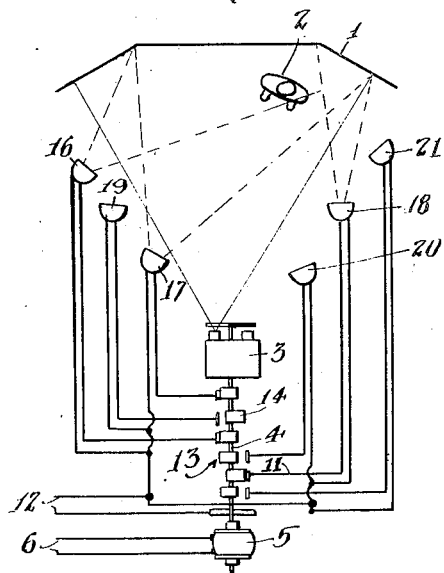
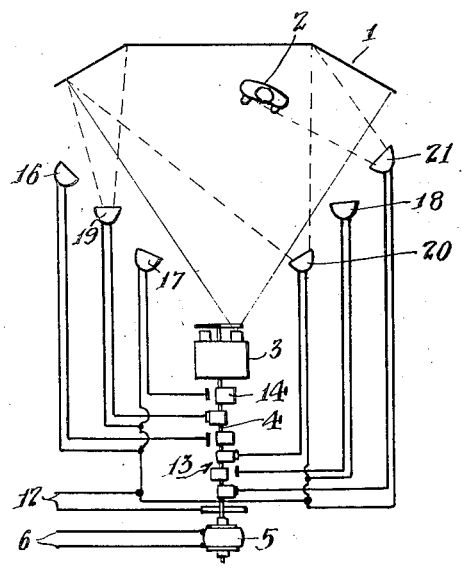
Inventor
Trimble de Roode
By Lyon & Lyon
Attorneys Nov. 24, 1936.                T. DE ROODE                    2,061,652
              METHOD OF CINEMATOGRAPHY AND APPARATUS FOR USE THEREIN
                    Original Filed March 23, 1931    2 Sheets-Sheet 2

Inventor
Trimble de Roode
By Lyon & Lyon attys

Patented Nov. 24, 1936

2,061,652

UNITED STATES PATENT OFFICE 2,061,652

METHOD OF CINEMATOGRAPHY AND
APPARATUS FOR USE THEREIN

Trimble de Roode, New York, N. Y.

Application March 23, 1931, Serial No. 524,739
Renewed May 15, 1935

18 Claims. (Cl. 88—16.6)

This invention relates to improvements in methods of and apparatus for cinematography, particularly for employment in the taking of motion picture plays and the like.

In general, the objects of this invention are to disclose and provide a method of and means for illuminating and photographing scenes, whereby the performers therein and the attendants thereof may be subjected to less heat and eye-strain, than heretofore requisite, without sacrifice of the quality of the pictures or, conversely, the quality thereof may be materially enhanced without an increase of such heat and eye-strain; whereby such persons may obtain a visual effect of the performance similar to the visual effect the pictures thereof are to have upon subsequent exhibition in a theatre; whereby the illumination is more efficiently employed, whether the pictures taken therewith are stereoscopic, ordinary, colored or otherwise; whereby the illumination is of increased photographic effectiveness, particularly as to strength and character; and whereby the illumination is of colored and of stereoscopic peculiarities.

These results and advantages are, in accordance with this invention, produced by a synchronized relation between the illumination and the movement of the camera employed, a correlation between the character of the illumination and that of the pictures taken therewith, a dispositional relation between the illumination and the performers or other outstanding elements of the scene, and a directional relation between the illumination and that of the camera viewpoint.

Other objects, uses and advantages of this invention will become apparent to those skilled in the art from the following detailed description.

In describing the invention reference will be had to the appended drawings which diagrammatically illustrate the arrangement of elements used in carrying out the invention.

In such drawings:

Fig. 1 diagrammatically represents, in plan view, an arrangement of elements by means of which the invention may be placed in operation.

Figs. 2 and 3 diagrammatically illustrate plan and elevation respectively of an elementary form of control for the illumination used as one of the elements of the apparatus which may be employed in carrying out the invention.

Figs. 4 and 5 are diagrammatic illustrations of another arrangement of elements by means of which the invention may be placed in operation.

Figure 6:
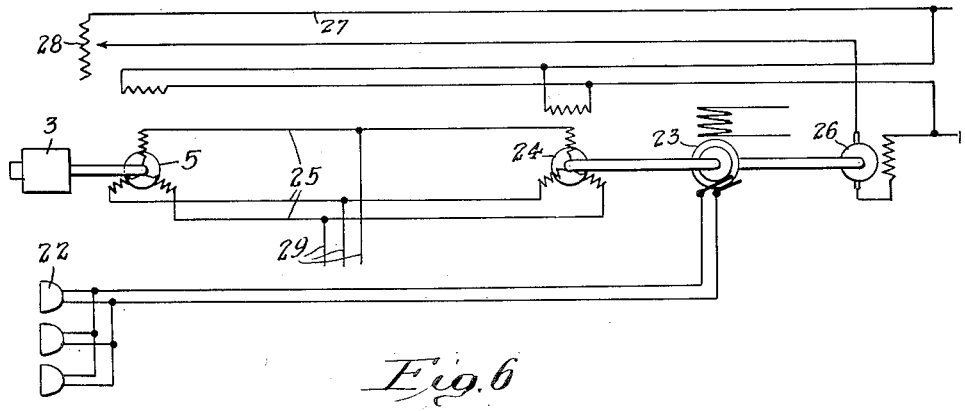
Fig. 6 is a diagrammatic representation showing a modification of the control for the illumination in the form of a generator synchronously connected to the camera.

In photographing motion picture plays, it is desirable to subject the actors and scenes to as high light intensity as possible so as to permit the camera employed to use a small aperture and take short exposures and thereby add clarity, sharpness and depth to the resulting pictures. But in employing such illumination, the performers suffer terrific eye-strain and extreme heat, the physiological effect of which has hitherto limited the light intensity employed and has required maximum curtailment of the periods of sustained photography.

Such conditions are so aggravated in the taking of large scenes as to require numerous and lengthy interruptions to permit the performers to recuperate. And for pictures in colors, the amount of light required so greatly exceeds the limit of endurance as to necessitate recourse to various sacrificial expedients such as, for instance, photographing with an overlarge aperture or overlong exposures, resulting in diminution of color values, blurring of images and other undesirable effects, particularly if the action is rapid, such as dancing, for instance.

Elementarily expressed, the photography conventionally consists of a rapid succession of exposures (usually sixteen, twenty or twenty-four per second) alternating with moments therebetween during which the film is shifted. To conform to the conditions existing, the shutters of the cameras used allow of adjustment whereby the duration of the exposures may be varied from a small fraction of to substantially equal to, the duration of the shifts. Thus one-half or, as is usually the case, considerably less than half, of each second is consumed by the exposures, and during the remainder of such second the film is not being exposed.

The strip film in the cameras is intermittently advanced, photographic exposures being made during periods of rest of the film. Therefore, so far as the actual photography is concerned, the illumination is needed only during the moments of exposure, and consequently, is unnecessary during the non-exposure moments therebetween.

Primarily, this invention contemplates operating the illumination in synchronism with the camera movement so that the illumination is rendered active during the exposure moments and rendered inactive during the non-exposure moments, thereby permitting a greatly reduced total amount of light and heat to which the performers are subjected yet maintaining the same effective light intensity for the exposures; or conversely, permitting a greatly increased light intensity for the exposures without increasing the total amount of light and heat to which the performers are subjected. It is evident, therefore, that the method of this invention does not interfere with normal camera operation nor with normal acting on the part of the actors. The actors appear to be constantly illuminated but inasmuch as the light sources are energized or permitted to direct their illumination upon the actors or objects only during actual moments of photography exposure, such actors are not subjected to the continued strain experienced during constant illumination and furthermore the amount of heat generated by artificial light sources is thus minimized.

Preferably, the synchronism is in multiple with the camera movement so that the lighting is alternately active and inactive with greater frequency than the frequency of the exposures, such as, for instance, thirty-two or forty-eight per second (corresponding to the anti-flicker opaque segments of the shutters used in theatre projectors), thus permitting the directors, cameramen and other attendants, as well as the performers, to observe the performance without disconcerting flicker and with substantially the same visual effect that the pictures thereof are to have upon reproduction and exhibition in a theatre.

Such effect may be obtained by rendering the lighting active for one or more brief instants admidst the non-exposure moment, or, possibly, by one or more brief inactive instants during the exposure moment.

As shown in Fig. 1, the set to be photographed may comprise a background 1 and a performer 2. Any suitable camera may be employed, such as the camera 3, which is preferably driven as by the shaft 4 of a motor 5 supplied with current by the lines 6. Sources of illumination, such as the lights 7, 8, 9 and 10, may be conventionally disposed to illuminate the area being photographed. Such lights may be fed by the lines 11 from the power lines 12 through a control device 13, which may be operated by the said shaft 4, whereby the current to the lights is controlled in synchronism with the camera movement.

To facilitate understanding of the principles involved, an elementary form of control device is illustrated in Figs. 3 and 4, in which the cams 14 mounted on the drive shaft 4 make and break contact with the lines 11 leading to the lights. The contact portions of the cams may, as shown, longitudinally vary in width so that, by shifting the cams along the shaft, (as by the operation of a locking screw 14a) the duration of the circuit closure may be varied; and, obviously by shifting the cams circumferentially of the shaft, the precise moment at which the closure occurs with respect to the camera movement may be readily adjusted. And, when required for certain purposes as hereinafter explained, the cams may be placed at various positions relative to each other such as, for example, certain thereof opposed to certain others so that the illumination will be operated in divisions. That is to say, instead of all the lights being rendered active or inactive together, certain lights will be active while others are inactive and vice versa.

It is to be understood, however, that to adequately handle, with sufficiently rapid frequency, the magnitude of current required to effectively illuminate the extensive areas regularly used in motion picture scenes, and especially the enlargement thereof embraceable by the advent of the wide film, more elaborate equivalents of the described control device may be employed instead such as, for instance, magnetic or electronic relays, amplifiers or the like. Parenthetically, attention is here called to the latter portion of this specification for more detailed descriptions of other suitable systems.

Although luminous tubes, arc-lights or other types of illumination may be used, the former are particularly suitable for the purposes of this invention because of their inherently low degree of heat emission and capability of extraordinarily rapid complete extinguishment of illumination upon de-energization. Under certain circumstances, it may be preferable to employ tungsten filament lamps, not only because of their availability but particularly because of their emitting, at the instant of their being energized, a brilliant flash of illumination greatly in excess of their immediately thereafter assumed normal degree of illumination. To obtain full advantage of this characteristic as well as to allow for more or less complete disappearance of their after-glow and residuary heat emission, these lamps require a somewhat longer period of time in which to cool than would be afforded during rapid frequency of energization. Divisional operation makes this cooling time available.

In other words, upon certain lights making their flash, preferably, they are not immediately re-energized for the next flash but are, instead, afforded a brief respite during which such next flash is performed by certain other lights and vice versa. Obviously, as many such divisions of lights may be employed as needed.

Incidentally, these flashes embody a considerably nearer blue-white shade of photographic ideality than that of the slightly yellow-red shade of incandescence normally emitted, normal photographic film being more susceptible to blue-white frequencies.

Thus, by repeatedly making use of the flash characteristics of such lights, each exposure is individually provided with a brilliancy of illumination similar to that of a chemical flash-light as well as having an enhanced photographic efficiency.

However, regardless of whether or not filament lights are employed, divisional operation of the illumination has other distinct advantages, such as in taking pictures in colors and in taking pictures stereoscopically; such advantages being additional to the hereinbefore mentioned primary advantages of rendering the illumination inactive between exposures, etc.

Among the additional advantages obtained by divisional operation, as applied to pictures in colors, is the production of a succession of pictures having better color values than otherwise feasible, especially in the case of systems wherein alternate exposures are to be of different colors; as, by employing divisional operation of the lights therewith, each succeeding exposure may be accompanied by a division of the lights differing in character from that of the other, such as each division giving an illumination particularly efficient for the photography of the particular color desired for the accompanying exposure. For instance, each division may comprise an inherently different type of illumination from that of the other, or each may be suitably colored to augment or dispense with color filters for the camera.

Entirely aside from the features mentioned in the immediately preceding paragraphs, certain material improvements in stereoscopically taken pictures may be attained by a divisional operation of the illumination by positionally disposing the lights so as to afford illumination alternately from different directions in synchronism with the exposures as well as with the order of the respectively left and right direction of the exposures, such as illustrated in Figs. 4 and 5.

Fig. 4 shows a moment of exposure taken through the left lens of the camera 3 while the lights 16, 17 and 18 are rendered active and which, because of their disposal relative thereto, intensely illuminate mostly the left sides of the prominent portions of the scene and performer, while the lights 19, 20 and 21 are rendered inactive, followed by, as shown in Fig. 5, a moment of exposure taken through the right lens of the camera while the latter lights are rendered active and which, because of their disposal relative thereto, intensively illuminate mostly the right sides of the prominent portions of the scene and performer, while the former lights are rendered inactive; thus there is afforded increased contract between the left and right views and thereby the stereoscopic effect thereof is greatly accentuated when subsequently suitably exhibited.

Furthermore, when thus disposed and if of opposed colors, whether operated intermittently or continuously, the pictures need not be taken stereoscopically but instead may be taken in colors in an ordinary way and likewise exhibited, and yet will nevertheless have a noticeable stereoscopic effect even when viewed by the naked eye.

Regardless of the features mentioned in the immediately preceding paragraphs, divisional operation of the lights may entail having a moment of general inactivity between the respective divisional activities, as would be ordinarily desirable; may entail having the respective activities immediately follow one another, as would be desirable in cases such as an extremely rapid succession of exposures especially if same be alternately colored or stereoscopic, or if the ending of one exposure and the beginning of the next occur substantially simultaneously as in the cases of employing a plurality of alternately moving films or a single continuously moving film using moving lenses or the like; or may even entail having the respective activities blend into each other, as would be desirable in the event of the adoption of certain proposed stereoscopic systems wherein, instead of a succession of left and right views, the stereoscopic effect is obtained by a succession of single exposures of which each is made during a sideways shifting of the angle of view thereof; as, in conjunction with the latter, the lights may be divisionally operated either as hereinbefore described, especially if in several divisions of which each in turn is rendered active corresponding to its position relative to the shifting angle of view, or else by employing a potentiometer to fade-in certain lights while fading-out certain others.

Regarding the hereinbefore parenthetically alluded to systems that may be employed in lieu of the systems that vary the lighting current, there may be instead employed a system whereby the current itself is generated in pulsations of a frequency and duration synchronous with the frequency and duration of the camera exposures.

Figure 7:
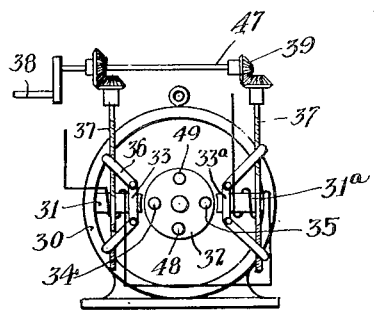
Fig. 7 is a diagrammatic view representing a generator which may be employed to produce relatively spaced impulses of current to the illuminating means synchronously with the camera movement.
Figure 8:
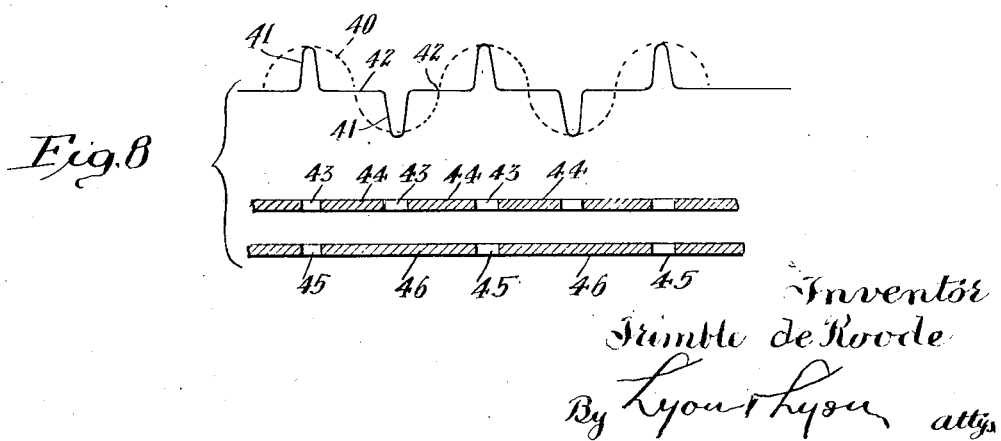
Fig. 8 is a diagrammatic view illustrating a desirable current-curve compared with a diagrammatic representation of a sequence of photographic exposures synchronously arranged with the pulsations of the current.

A system of such character is illustrated in Figs. 6, 7 and 8, in which, as shown in Fig. 6, the lights 22 are supplied with current from the alternating current generator 23 which is synchronized with the movement of the camera 3 either directly therewith, as through a flexible shaft connecting the armature of the generator with the drive shaft of the camera or, preferably, electrically such as, for example, by the self-synchronizing telemotor connection including the exciter 24 driven by the generator and the camera motor 5 connected thereto by lines 25. The generator may be driven as by the motor 26 controlled from the rheostat 28 adjacent the camera through the line 27. Lines 29 may lead to a second camera or to a sound recording machine and thus insure perfect synchronization.

The frequency of the generator selected will be proportioned to the speed of the camera shutter so that during the moments that the shutter is open, to expose the film, the current value of the generator is at or near its maximum or sine peak thereby rendering the lights active, while during the moments that the shutter is closed the current value of the generator is at or near its minimum or sine zero thereby rendering the lights inactive.

However, in the case of multiple synchronism, as hereinbefore described, the frequency of the generator may be so proportioned to the speed of the camera shutter as to supply additional current peaks which occur amidst the shutter closures or may even supply additional current zeros which occur during the shutter openings.

Obviously, the more nearly it is possible to attain a succession of absolutely instantaneous illumination separated by like periods of darkness, the more effective the system will be. For this purpose, as shown in Fig. 7, the generator employed comprises a field 30 having poles 31 and 31a between which rotates the armature 32 carrying the armature winding or conductors 34 and 35. By arranging around the inner ends of the poles suitable magnetic shields 33 and 33a, comprising bands or rings of magnetic material, the magnetic field produced by each of these poles may be limited to a relatively narrow compass; all of the lines of force from the poles, except those passing directly toward the armature, will be diverted by the magnetic shields and thus be rendered ineffective to generate a current in the armature windings.

The sine curve of the current thus generated will be of the character shown in Fig. 8, as during the travel of the armature winding or conductors 34 and 35 between the poles there will be substantially no lines of force to be cut and, therefore, the current generated will be at zero value, but as the conductor passes into the relatively narrow field of pole 31a current will then be generated which will rise sharply from zero to maximum and then, as the conductor passes out of the field, the current will rapidly descend to again arrive at a zero value. Likewise, when the conductor passes by the other pole, a similar sudden rise and fall in the current will occur, but in the opposite direction.

In other words, the generator will produce a pulsating current which, instead of representing a true sine curve (shown as 40), will represent a succession of short sharp maximum current peaks 41 separated by long flat spaces of zero or minimum current value 42, and which, if properly synchronized with the shutter of the camera, will coincide with the open and closed moments thereof as indicated by 43 and 44 respectively or, in the case of multiple synchronism, as by 45 and 46, for instance.

So that the durations of the maximums relative to the durations of the minimums therebetween may be varied to correspond to increased or decreased open and closed durations of the camera shutter, accordingly as the same may be changed from time to time to conform to the existing photographic conditions of the scene being taken, the magnetic shields, as shown in Fig. 7, are mounted on brackets 36 carried by screws 37 having oppositely threaded ends operatively joined to the hand-crank 38, through bevel gears 39 and the shaft 47.

By employing other armature windings 48 and 49 connected to separate collector rings to supply current to other lights than those supplied by the windings 34 and 35, the illuminating means may be thusly operated divisionally and in predetermined relation to each other as well as to the camera shutter movement.

It is not deemed necessary to further dwell herein upon the details of such a system as this description will suffice for those skilled in the art.

In any case, it is not to be understood that the inactive moments of illumination need necessarily be of complete darkness, for same may instead comprise merely diminished illumination; therefore by the term "inactive", as used herein, reference is made to the illumination being extinguished, dimmed, masked, directed away from the area being photographed, or away from the angular direction from which a certain portion thereof is being photographed, or any other manner of effecting the illumination as opposed to the term "active".

By the term "active", as used herein, reference is made to the illumination being illuminated, brightened, intensified, unmasked, directed towards the area being photographed, or towards the angular direction from which a certain portion thereof is being photographed, or any other manner of effecting the illumination as opposed to the term "inactive".

Nor is it to be understood that the principles of this invention are limited to the employment thereof in association with artificial illumination for instead thereof natural illumination may be likewise employed. For instance, when taking motion picture plays by daylight, reflectors are customarily employed to intensify or concentrate the light upon certain places, or to lighten those which may be in shadow, such as the faces of the performers which are usually kept unexposed to the direct heat and glare of sunlight so as to save them not only from such heat but especially to avoid strained facial expressions, particularly squinting of their eyes. In this case, such reflectors may be suitably arranged, as by turning, oscillating or otherwise, to reflect the light alternately towards and away from the performers' faces synchronously with the camera movement.

Those skilled in the art will realize the advantages of the features embodied in this invention and the various occasions on which same may be most effectively placed in operation.

The invention is not limited to the specific arrangement of elements or sequences of steps defined hereinabove, but instead embraces all such changes and modifications as come within the scope of the appended claims.

I claim:

1. In a method of cinematography, the steps of intermittently advancing a strip film, taking a plurality of photographs of an object by a rapid succession of photographic exposures on said film during periods of rest thereof, and varyingly illuminating the object during such photographing in timed relation to the photographic exposures by illumination from a plurality of illuminating sources operated alternately.

2. In a method of cinematography, the steps of intermittently advancing a strip film, taking a plurality of photographs of an object by a rapid succession of photographic exposures on said film during periods of rest thereof, and varyingly illuminating the object during such photographing in timed relation to the photographic exposures by illumination directed upon the object from a plurality of illuminating sources operated divisionally in succession.

3. In a method of cinematography, the steps of intermittently advancing a strip film, taking a plurality of photographs of an object by a rapid succession of photographic exposures on said strip film during periods of rest thereof, and intermittently illuminating the object in multiple synchronism with said photographic exposures during said photography, the frequency of moments of illumination being a multiple of the frequency of photographic exposures, whereby the effect of heat generated by sources of illumination upon the object being photographed is minimized, although said object appears to be completely and continuously illuminated during said photography.

4. In a method of cinematography, the steps of intermittently advancing a strip film, taking a plurality of photographs of an object by a rapid succession of photographic exposures on said strip film during periods of rest thereof, and intermittently illuminating the object in multiple synchronism with said photographic exposures during said photography, the frequency of moments of illumination being a multiple of the frequency of photographic exposures, the duration of moments of illumination being substantially equal to the duration of moments of photographic exposure.

5. In a method of cinematography, the steps of intermittently advancing a strip film, illuminating an object to be photographed, rapidly photographing the object by a rapid succession of photographic exposures during periods of rest of said strip film, intermittently increasing the illumination on the object in timed relation to photographic exposures during said photography, the duration of increased moments of illumination being substantially equal to the duration of moments of photographic exposures.

6. In an apparatus of the character described, the combination of a camera adapted to intermittently advance a strip film and take photographs of an object in rapid succession during periods of rest of said film, means for operating the camera, means for illuminating the object to be photographed by said camera, and means operably related to said camera operating means for varying said illuminating means in timed relation to periods of rest of said film in said camera.

7. In an apparatus of the character described, the combination of a camera adapted to record photographic images of an object in rapid succession, said camera including means for intermittently advancing a strip film, means for operating the film advancing means in said camera, means for illuminating the object to be photographed, means operably related to said camera operating means for rendering said illuminating means active in timed relation to said film advancing means in said camera, and means for adjustably regulating the duration of moments of illuminating means activity relative to moments of inactivity of said illuminating means.

8. In an apparatus of the character described, the combination of a camera adapted to take photographic exposures of an object in rapid succession, means for driving the camera, means for illuminating the object to be photographed, means operably related to said camera driving means for intermittently rendering said illuminating means active in timed relation to photographic exposures made by said camera, and means for adjustably regulating the duration of moments of activity of said illuminating means relative to moments of inactivity of said illuminating means.

9. In an apparatus of the character described, the combination of a camera adapted to take photographic exposures of an object in rapid succession, means for driving the camera, means adapted to be electrically activated for illuminating the object to be photographed, and means synchronized with said camera driving means for supplying surges of electrical energy to said illuminating means in multiple synchronism with moments of exposure of said camera.

10. In an apparatus of the character described, the combination of a camera adapted to take photographic exposures of an object in rapid succession, means for driving the camera, means adapted to be electrically activated for illuminating the object to be photographed, means synchronized with said camera driving means for supplying surges of electrical energy to said illuminating means in timed relation to moments of exposure of said camera, and means for adjustably regulating the duration of moments of illuminating means activity relative to moments of inactivity of said illuminating means.

11. In an apparatus of the character described, the combination of a camera adapted to take photographic exposures of an object in rapid succession, a camera driving motor, means adapted to be electrically activated for illuminating the object to be photographed, and a generator operably connected to said illuminating means, said generator being adapted to deliver a current synchronized in frequency with moments of exposure of said camera.

12. In an apparatus of the character described, the combination of a camera adapted to take photographic exposures of an object in rapid succession, a camera driving means, means adapted to be electrically activated for illuminating the object to be photographed, a generator operably connected to said illuminating means, said generator being adapted to deliver surges of electrical current to said illuminating means in timed relation to moments of exposure of said camera, and means for adjustably regulating the duration of current delivery moments of said generator to correspond to the duration of moments of exposure of said camera.

13. In an apparatus of the character described, the combination of a camera adapted to record photographic images of an object in rapid succession, means for operating the camera, means for illuminating the object to be photographed, means operably related to said camera operating means for rendering said illuminating means active in timed relation to said camera, and means for adjusting the disposition of moments during which said illuminating means is active with respect to time of photographic exposures.

14. A method of decreasing eye strain during monochromatic cinematography, which comprises photographing an object on an intermittently advancing film, and discontinuously illuminating the object with substantially white light from separate light sources so as to permit photography by a rapid succession of illuminated moments, said illuminated moments being timed with respect to moments of photographic exposure during periods of rest of said intermittently advancing film, said separate light sources being alternately operated so as to permit cooling of said sources between moments of illumination.

15. In a method of cinematography, the steps of intermittently advancing strip film, subjecting said film to photographic exposures during periods of rest of said film, and illuminating the object being photographically recorded on the film from the right and left alternately during alternate periods of rest of said film, the frequency of moments of illumination being a multiple of the frequency of photographic exposures.

16. In an apparatus of the character described, the combination of a camera adapted to take photographic exposures of an object in rapid succession and including means for intermittently advancing strip film therein, illuminating means positioned out of the field of view of said camera and adapted to illuminate the object to be photographed, and means for rendering said illuminating means active during periods of rest of the film, said means for rendering said illuminating means active including means for producing a plurality of instants of illumination during each period of rest of the film.

17. In an apparatus of the character described, the combination of a camera adapted to take photographic exposures of an object in rapid succession and including means for intermittently advancing strip film therein, illuminating means positioned out of the field of view to the right and to the left of said camera and adapted to illuminate the object to be photographed, means for rendering the illuminating means positioned to the right of the camera active during alternate periods of rest of the film, means for rendering illuminating means positioned to the left of the camera active during intermediate periods of rest of the film, and means for producing a plurality of instants of illumination during each period of rest of the film.

18. In an apparatus of the character described, the combination of a camera adapted to take photographic exposures of an object in rapid succession and including means for intermittently advancing strip film therein, illuminating means positioned out of the field of view of said camera and adapted to illuminate the object to be photographed, a portion of said illuminating means being adapted to illuminate the object with light composed essentially of one color, another portion of said illuminating means being adapted to illuminate the object with light composed essentially of another color, means for rendering illuminating means emitting illumination of one color active during alternate periods of rest of the film, means for rendering illuminating means emitting another color active during intermediate periods of rest of the film, and means for producing a plurality of instants of illumination during each period of rest of the film.

TRIMBLE DE ROODE.